Jan. 5, 1932.    M. CORNU    1,839,299
ALTERNATING CURRENT MACHINE
Filed March 19, 1930
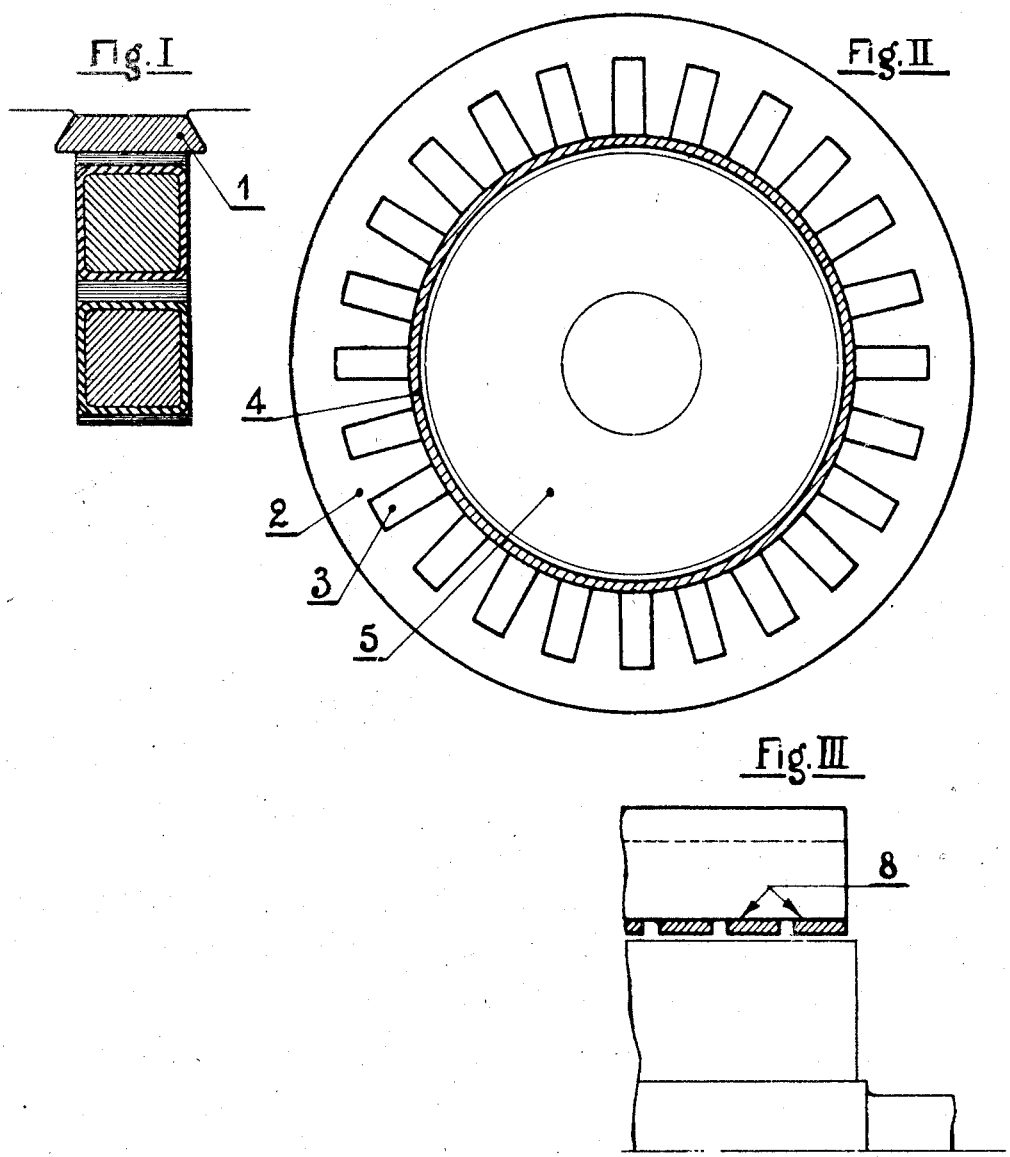

Patented Jan. 5, 1932

1,839,299

UNITED STATES PATENT OFFICE

MAURICE CORNU, OF MARCINELLE, BELGIUM, ASSIGNOR TO ATELIERS DE CONSTRUCTIONS ELECTRIQUES DE CHARLEROI, OF BRUSSELS, BELGIUM, A BELGIAN SOCIETE ANONYME

ALTERNATING CURRENT MACHINE

Application filed March 19, 1930, Serial No. 437,237, and in Belgium March 21, 1929.

This invention relates to alternating current electrical machines, and more particularly to the construction of slotted cores for such machines, using slots of the "open" type, which facilitate considerably the carrying out of the winding. For electrical reasons the use of open slots is often not possible, unless they can be closed magnetically after fitting the winding in place.

The invention has for its object to provide improved means for the magnetic and mechanical closure of the open stator-slots of alternating current machines.

The invention is hereafter described with reference to the accompanying diagrammatic drawings in which:—

Figure 1 is a cross section through an open core-slot containing two conductors held in place by a slot wedge.

Figure 2 is a transverse section through the stator of an electrical machine with open core slots, having a closure member according to the invention.

Figure 3 is a partial longitudinal section of the stator shown in Figure 2.

The methods most commonly employed for closing the open core-slots are based upon the arrangement of magnetic slot wedges, introduced longitudinally into the slots after winding, as is indicated in Figure 1, upon which 1 is the magnetic wedge.

This method of closure of the open slots presents as its main drawback, of frequent occurrence and difficult to avoid, that the vibrations of the slot wedge, when subjected to an alternating flux, may bring about the deterioration of the wedge and of the walls of the slot in which this wedge is mounted.

The improved system of magnetic and mechanical closure of the open slots, according to the present invention, does away with the grave disadvantage pointed out above, and allows moreover an easier construction.

The principle upon which the invention is based is shown in the example of construction represented in Figure 2 of the drawings, where 2 is the stator with open slots 3, and 5 is the rotor.

The open slots 3 are closed, after the completion of the winding, by means of smooth rings or annuli 4, introduced with a given tightness of fit into the stator 2.

The partial longitudinal section represented in Figure 3 shows the rings or annuli 4 arranged end to end. The thickness and the width of these metal rings are determined by the conditions of operation of the machine.

The magnetic material constituting the rings is likewise selected judiciously in order to suit the conditions of operation; for example they may be made of cast iron.

The principal advantages of the slot closure device according to the present invention are:—

(a) Preparation of the conductor sections or windings in their final shape before mounting.

(b) Consequently reduced time of carrying out the winding of the machine.

(c) Great security of working both for the winding and for the closure rings, which are not subject to vibration.

(d) Great facility of repair.

What I claim is:—

1. In an alternating current machine, the combination of a slotted core having open slots, and an annular magnetic closure member bridging the open ends of said slots, said annular member being divided transversely of its axis.

2. In an alternating current machine, having a stator with open slots, a closure member comprising a plurality of plain homogeneous rings of magnetic material, said rings forming a mechanical closure for the open ends of the slots as well as a magnetic closure therefor.

3. In an alternating current machine, having a stator with open slots, a plurality of smooth rings of homogeneous magnetic material inserted in the interior of said stator, said rings being disposed end to end and providing magnetic bridges to close the open ends of the slots as well as a mechanical closure therefor.

4. In an alternating current machine, having a stator with open slots, a plurality of smooth rings of homogeneous magnetic material introduced into the interior of said stator, said rings being disposed end to end and making mechanical contact with said stator between the slots.

In testimony whereof I have affixed my signature.

MAURICE CORNU.